Sept. 29, 1959        E. R. ZIEGLER        2,905,962

WINDSHIELD CLEANING SYSTEM

Filed Jan. 15, 1958        3 Sheets-Sheet 1

INVENTOR.
Eugene R. Ziegler
BY
G. H. Strickland
His Attorney

Sept. 29, 1959          E. R. ZIEGLER          2,905,962
WINDSHIELD CLEANING SYSTEM
Filed Jan. 15, 1958          3 Sheets-Sheet 2
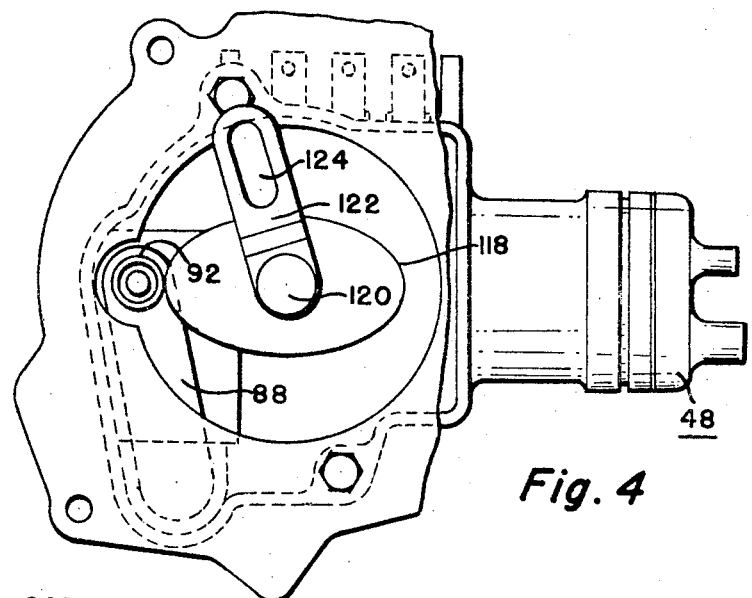
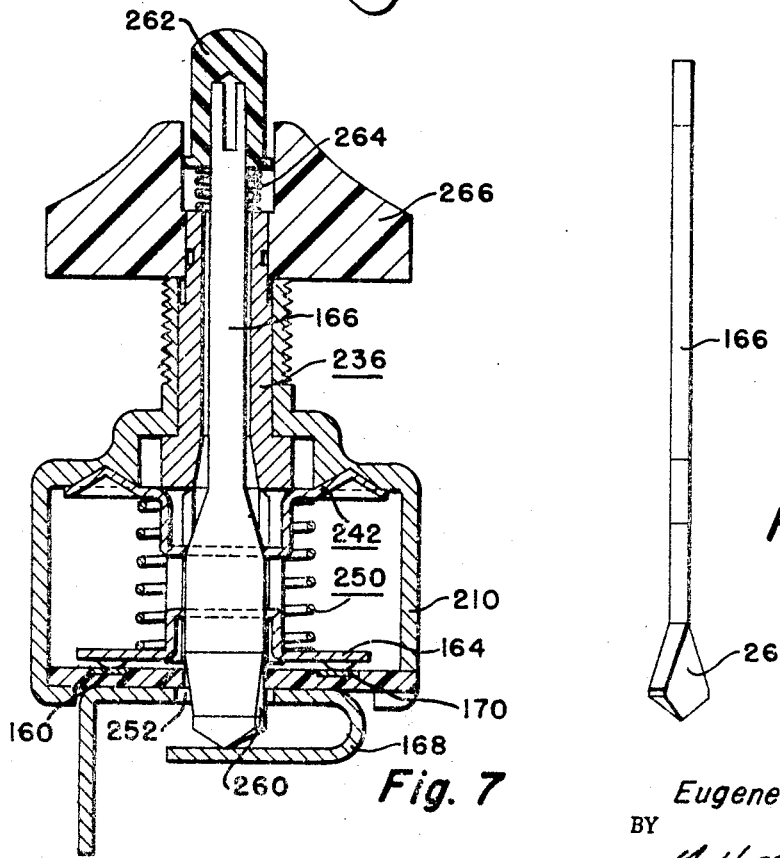
INVENTOR.
Eugene R. Ziegler
BY
*G. H. Strickland*
His Attorney Sept. 29, 1959  E. R. ZIEGLER  2,905,962
WINDSHIELD CLEANING SYSTEM
Filed Jan. 15, 1958  3 Sheets-Sheet 3
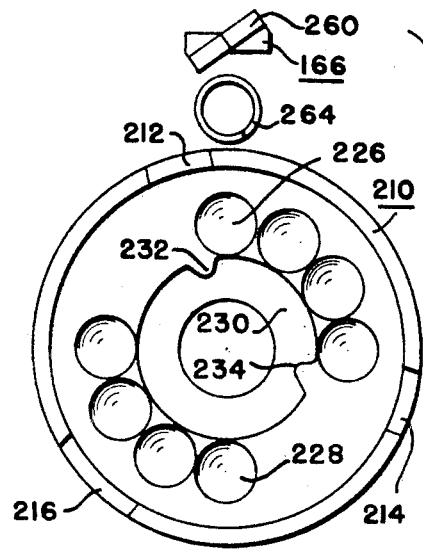
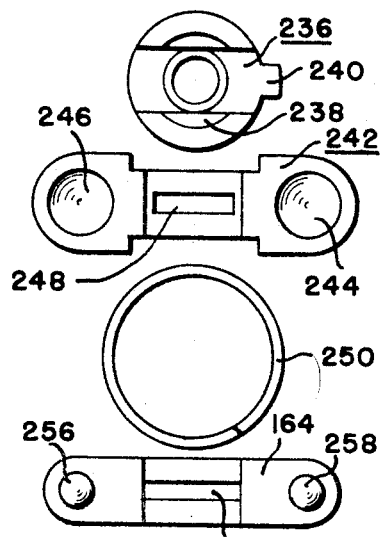
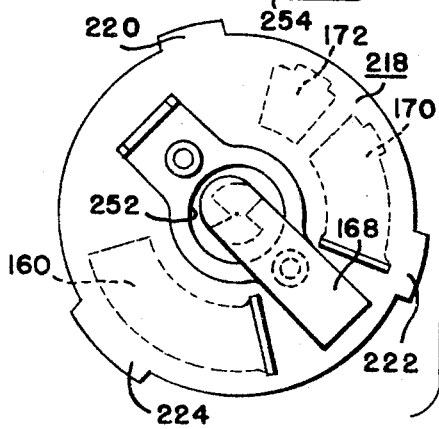
Fig. 5
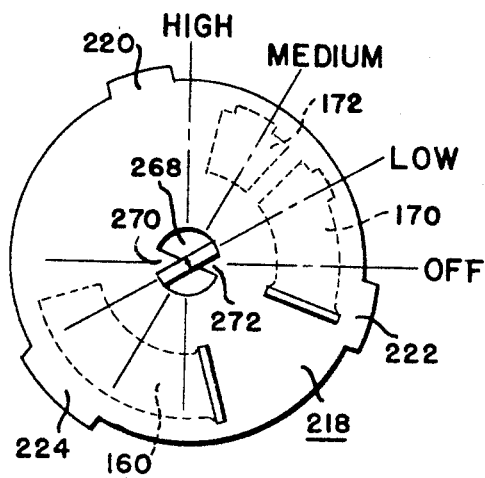
Fig. 8
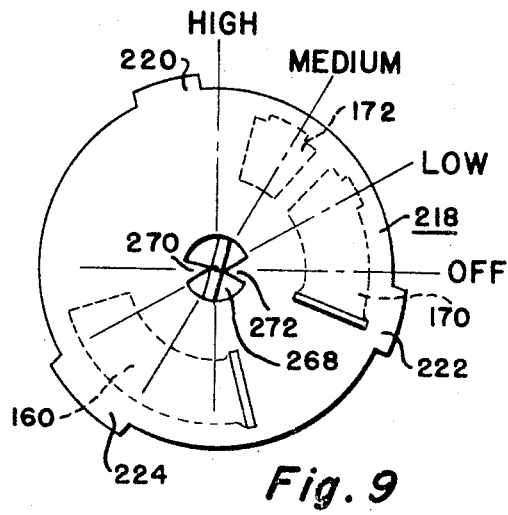
Fig. 9
INVENTOR.
Eugene R. Ziegler
BY
G. H. Strickland
His Attorney «United States Patent Office 2,905,962
Patented Sept. 29, 1959

2,905,962

WINDSHIELD CLEANING SYSTEM

Eugene R. Ziegler, Spencerport, N.Y., assignor to General Motors Corporation, Detroit, Mich., a corporation of Delaware Application January 15, 1958, Serial No. 709,056

10 Claims. (Cl. 15—250.4)

This invention pertains to the art of windshield cleaning, and particularly to a system wherein solvent is sprayed onto a windshield conjointly and in timed relation with movement of a wiper blade thereacross.

In my prior application, Serial No. 705,199, filed December 26, 1957, a windshield cleaning system is disclosed comprising a wiper unit and a washer unit operable by a single motor, and wherein during a cycle of conjoint operation the washer unit operates for a predetermined number of wiper strokes and is then automatically arrested whereas the wiper unit continues to operate until it is manually shut off. This type of windshield cleaning system is particularly adapted for vehicles having compound curved windshields wherein the liquid solvent discharged by the washer unit may cling to the windshield above the path traversed by the wipers, such that after the wiper unit is automatically arrested, the liquid solvent may thereafter streak the windshield requiring an additional manipulation by the driver to activate and arrest the wiper unit. The present invention relates to an improved manual shut-off wiper unit comprising a rotary switch for controlling the wiper unit and a coaxially mounted push button switch for controlling the washer unit whereby actuation of the washer push button automatically rotates the wiper control switch to the low speed position.

Accordingly, among my objects are the provision of an improved reciprocable washer pump having an interruptible driving connection with an electric motor; the further provision of a windshield cleaning system including a wiper unit and a washer unit wherein activation of the washer unit control simultaneously activates the wiper unit control, the washer unit being operable for a predetermined number of wiper strokes and then arrested whereas the wiper unit continues to operate until manually inactivated by the driver; and the still further provision of a coordinated control assembly for a wiper unit and a washer unit including a rotary wiper unit control member and a reciprocable washer unit control member arranged so that actuation of the washer unit control member turns the wiper unit control member.

The aforementioned and other objects are accomplished in the present invention by forming a helical cam surface on the end of a rotatable and reciprocable rod, the cam surface coacting with a fixed base and rotatable switch contact such that movement of the rod in one direction rotates the switch contact, whereas movement of the rod in the opposite direction does not rotate the switch contact. Specifically, the cleaning system disclosed herein includes a wiper unit which may be of the general type shown in copending application Serial No. 686,432, filed September 26, 1957, in the name of Harry W. Schmitz et al., and assigned to the assignee of this invention. Accordingly, the wiper unit includes a unidirectional motor having a continuous driving connection with a rotary crank assembly. The rotary crank assembly has a running orbit wherein the wiper blades oscillated thereby are moved throughout a running stroke, the inboard end of which is above the cowl of the vehicle. When the crank assembly operates in its parking orbit, the wiper blades are moved throughout a parking stroke of the same amplitude as the running stroke, but the path is shifted so that the inboard stroke end is against the cowl of the vehicle. When the wiper blades arrive in the depressed parked position against the vehicle cowl, the wiper motor is automatically deenergized.

The washer unit comprises a reciprocable pump having a rubber, or rubber-like, bulb as the liquid displacing member. The bulb is connected to a reciprocable rod for effecting the intake stroke, a suitable spring being employed to effect the delivery stroke of the bulb. The pump rod has an interruptible driving connection with the motor, as controlled by the position of a ratchet cam assembly and an electromagnet. In addition, the ratchet cam assembly constitutes a stroke counting device and includes a lockout cam for automatically arresting the washer unit by interrupting the driving connection between the pump rod and the motor after a predetermined number of wiper strokes during a cycle of conjoint operation of the washer unit and the wiper unit.

The wiper unit can be operated independently of the washer unit, and under these conditions the driving connection between the pump rod and the motor is interrupted. When the washer unit is activated by energization of the electromagnet, the wiper unit control switch is simultaneously moved to the low speed position. If the wiper unit control switch is left in this position the washer unit will operate for a predetermined number of strokes of the wiper unit and then be automatically arrested. The wiper unit will continue to operate until the wiper unit control switch is manually turned off by the driver.

Further objects and advantages of the present invention will be apparent from the following description, reference being had to the accompanying drawings, wherein a preferred embodiment is clearly shown.

In the drawings:

Figure 4 is a fragmentary view, in elevation, taken along line 4—4 of Figure 1.

Figure 5 is an exploded view of the control switch assembly, with the parts in the "off" position.

Figure 6 is a view, in elevation, of the washer unit switch rod.

Figure 7 is a sectional view of the control switch assembly with the washer unit switch closed and the wiper unit switch in the low speed position.

Figure 8 is a rear view of the switch base and switch blade in the "off" position.

Figure 9 is a rear view of the switch base with the washer unit switch rod depressed and the switch blade in the low speed position.

Figure 1:
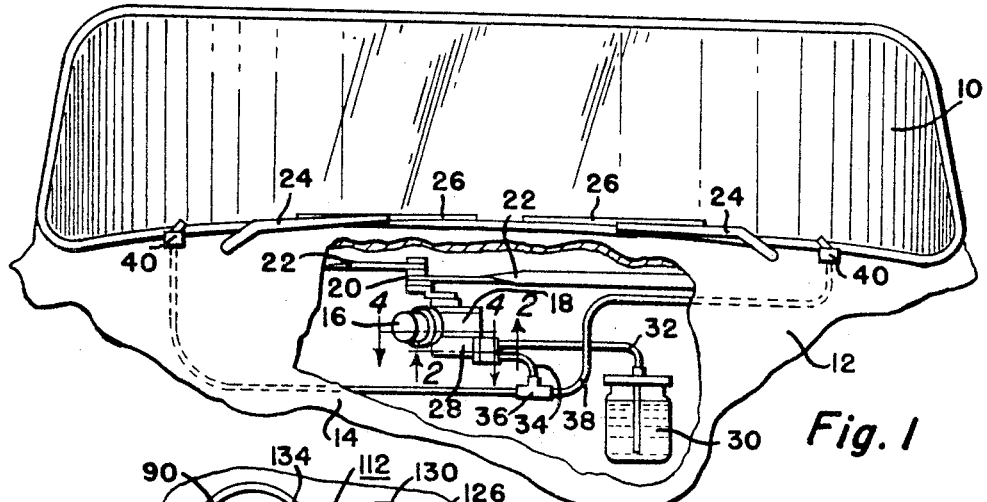
Figure 1 is a fragmentary view, partly in section and partly in elevation, of a vehicle equipped with the windshield cleaning system of this invention.

With particular reference to Figure 1, a portion of a vehicle is shown including a windshield 10, a cowl 12 and a firewall 14. The vehicle is equipped with windshield cleaning mechanism including a wiper unit having a unidirectional electric motor 16 connected to a gear reduction unit 18. The gear reduction unit is drivingly connected to a crank assembly 20 having a running orbit and a parking orbit. The inner ends of drive links 22 are rotatably connected to the crank assembly, the outer end of the drive links being operatively connected to spaced pivot shafts, not shown, to which wiper arms 24 are drivingly connected. The wiper arms carry wiper blades 26 which are oscillatable across the outer surface of the windshield 10 in asymmetrical paths.

The wiper unit may be of the type shown in the aforementioned copending application Serial No. 686,432, and thus when the crank assembly operates in its running orbit, the wiper blades 26 are oscillated throughout a running stroke, the inboard end of which is above the cowl 12 of the vehicle. When the crank assembly 20 operates in its parking orbit, the wiper blades 26 are oscillated throughout the same angle, but the inboard stroke end is against the cowl 12. In addition, as will be pointed out more particularly hereinafter, when the wiper blades 26 arrive at the depressed parked position against the vehicle cowl, as shown in Figure 1, the wiper motor 16 will be automatically deenergized.

The windshield cleaning system also includes a washer unit comprising a pump and control assembly 28 which can be driven from the gear reduction 18 by the wiper motor 16. The pump has an interruptible driving connection with the motor 16, and when the driving connection is established, the pump will draw liquid solvent from a reservoir 30 through an intake hose 32 and discharge liquid solvent through conduit 34 to a T-coupling 36. The T-coupling 36 is connected to hoses 38 which communicate with discharge nozzles 40 mounted on the cowl, and through which liquid solvent is discharged onto the windshield 10 into the paths of the moving wiper blades 26, and in timed relation with the stroking movement thereof.

Figure 2:
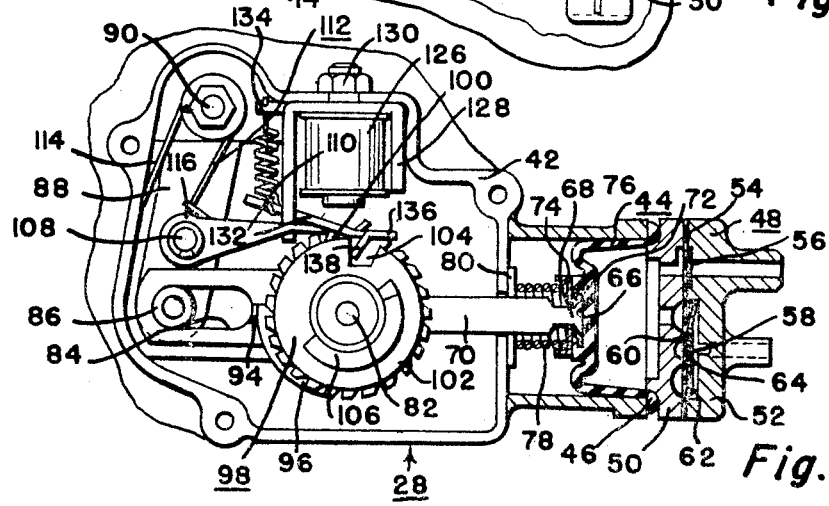
Figure 2 is a fragmentary view, partly in section and partly in elevation, of a washer pump and control assembly constructed according to this invention, taken along line 2—2 of Figure 1.

With reference to Figure 2, the washer pump and control mechanism 28 is disposed within a housing 42 attached to the housing for the gear reduction unit 18. The pump includes an elastomeric bulb 44 having an open end with a lip 46. The lip 46 is clamped between the end of the housing and a check valve assembly 48 by a plurality of screws, not shown, which extend through holes in the check valve assembly 48 and are threadedly received by the housing 42. The check valve assembly 48 comprises a base 50 and a cap 52 between which a flexible rubber diaphragm 54 is disposed. The rubber diaphragm has a flap-type inlet check valve 56 and an outlet port 58. A portion of the diaphragm 54 is urged into sealing engagement with a circular shoulder 60 on the base 50 by a flat spring 62 having a central opening 64 aligned with the opening 58 in the diaphragm. Upon collapse of the bellows 44, the flap valve 56 will be urged to the closed position, and the pressure will react against the diaphragm 54 so as to compress the spring 62 whereby liquid will flow between the shoulder and the diaphragm and through aligned holes 58 and 64 to the conduit 34.

The closed end of the bulb 44 is formed with a depression 66 within which an enlarged end 68 of a pump rod 70 is disposed. The enlarged end 68 of the pump rod 70 is connected to the bulb 44 by a pair of spaced washers 72 and 74 which circumscribe the rod 70 and embrace a lip 76 that partially encircles the depression 66. The washer 74 also constitutes a retainer for one end of a coiled compression spring 78, the other end of which engages a retainer 80 that circumscribes the rod 70 and abuts the housing 42. The spring 78 is operative to collapse the bulb 44 and effect a delivery stroke of the washer pump, as will be described more particularly hereinafter.

The rod 70 has an elongate intermediate longitudinal slot, not shown, through which a fixed stub shaft 82 extends. In addition, the rod 70 is formed with an arcuate longitudinal slot 84 adjacent the other end thereof through which a cam follower 86 extends. The pin 86 is attached to a lever 88 mounted for pivotal movement about a pin 90 in the housing 42. The pin 86 projects from the other side of the lever 88 and carries a roller-type follower 92, as shown in Figure 4. In addition, the pump rod 70 has an upstanding lug-type follower 90 engageable with a lockout cam 96 formed as an integral part of a ratchet cam assembly 98 which is journalled for rotation on the shaft 82 in the counterclockwise direction only, as viewed in Figure 2. The ratchet cam assembly 98 is also formed with a ratchet toothed periphery 100, a cylindrical peripheral portion 102 having a notch 104 and a face cam 106. The lockout cam 96 may subtend an angle of 180°, as does the face cam 106. As long as the lug follower 94 engages the lockout cam 96, movement of the pump rod 70 to the right as viewed in Figure 2, under the urge of spring 78 is prevented. Moreover, the elongated slot 84 allows reciprocation of the pin 86 relative thereto without imparting any movement of the rod 70, thus constituting a lost motion connection.

The lever 88 also carries a second pin 108 upon which a drive pawl 110 is pivotally mounted. The lever 88 is biased in the counterclockwise direction as viewed in Figure 2, by a hairpin spring 112, one end of which 114 engages the housing 42, and encircles the pivot pin 90 and the other end of which 116 encircles the pivot pin 108 and biases the drive pawl 110 into engagement with the ratchet cam assembly 98. As seen in Figure 4, the roller-type follower 92 engages a two-lobe cam 118 attached to a shaft 120. The hairpin spring 112 maintains the follower 92 in engagement with the cam 118 since it biases the lever 88 in the counterclockwise direction, as viewed in Figure 2. The shaft 120 has attached thereto a crank arm 122 with an arcuate radial slot 124. The radial slot 124 receives a crank pin, not shown, attached to a worm gear, not shown, of the gear reduction unit which is continuously driven by the motor 18 during rotation thereof. Since the crank assembly 20 makes one complete revolution for every complete revolution of the worm gear, the crank arm 122, the shaft 120 and the cam 118 also make a complete revolution during each revolution of the worm gear. Thus, when the driving connection between pump rod 70 and the cam 118 is established, that is when the lug follower 94 does not engage the lockout cam 96, the washer pump will complete two intake strokes and two delivery strokes during each revolution of the cam 118. Since a complete revolution of the cam 118 results in an inboard stroke and an outboard stroke of the wiper blade 26 through the crank assembly 20, it will be appreciated that when the washer unit is operative it will discharge liquid solvent in timed relation with the stroking movement of the wiper blades.

The driving connection between the pump rod 70 and the cam follower 86 is controlled by an electromagnet 126 having a U-shaped frame 128 attached to the housing 42 by a bolt 130. An armature 132 is pivotally mounted on the U-shaped frame 128, and biased into engagement with the ratchet cam 98 by a spring 134. The armature 132 has a ramp portion 136 and a follower portion 138, the follower portion 138 being disposed within the notch 104 when the ratchet cam is in the "off" position, as shown in Figure 2. With the follower portion 138 in the notch 104, reciprocation of the drive pawl 110 does not effect movement of the ratchet cam 98 in the counterclockwise direction as viewed in Figure 2, since the driving end of the pawl 110 rides up the ramp 136 and does not engage the ratchet teeth 100. Upon energization of the electromagnet 126, the armature 132 moves into engagement with the core of the electromagnet, thereby permitting the end of the driving pawl 110 to engage the ratchet teeth 100. Moreover, upon a one tooth movement of the ratchet wheel 98 in the counterclockwise direction as viewed in Figure 2, the follower portion 138 will engage the cylindrical periphery 102, so that the ramp 136 will remain in an inoperative position until the ratchet cam assembly completes one revolution. Thus, the electromagnet 126 need only be momentarily energized to initiate operation of the washer unit. A one tooth movement of the ratchet cam 98 in the counterclockwise direction will likewise disengage the lug follower 94 from the lockout cam 96 thereby permitting the spring 78 to compress the bulb 44 while the pin 86 can move the rod 70 so as to expand the bulb 44.

Figure 3:
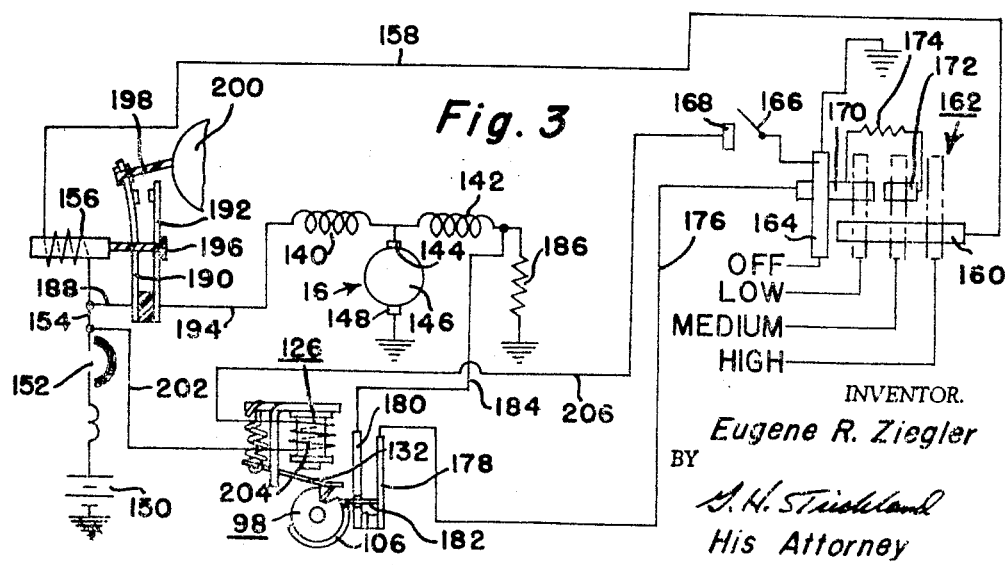
Figure 3 is an electric schematic depicting the circuits for energizing the wiper unit alone, or for energizing the wiper unit and the washer unit for conjoint operation.

With reference to Figure 3, the motor 16 is of the compound wound type and includes a series field winding 140 and a shunt field winding 142, the inner ends of which are connected. The connection between the series and shunt field windings is electrically connected to a commutator brush 144 which is electrically connected to an armature 146. A second commutator brush 148 is connected to ground. The motor 16 can be energized from a battery 150. The battery 150 has one terminal connected to ground and its other terminal is connected through a thermal overload switch 152 to a wire 154. Wire 154 connects with a relay coil 156, the other end of the relay coil connecting with wire 158.

The wire 158 is connected to a stationary switch contact 160 of a coordinated control switch assembly 162. A structural embodiment of the coordinated switch assembly will be described hereinafter but schematically the switch assembly includes a movable bridging contact 164, a push button contact 166, and stationary contacts 168, 170 and 172. Movable switch contacts 164 and 166 are connected to ground. Stationary switch contacts 170 and 172 are interconnected by a resistor 174, and in addition, stationary contact 170 is connected to a wire 176. Wire 176 connects with a leaf spring switch contact 178 that is engageable with a leaf spring switch contact 180. The leaf spring switch contact 178 has a follower 182 engageable with the face cam 106 of the ratchet cam assembly 98. When the follower 182 engages the face cam 106, the contact 178 is moved out of engagement with the contact 180. When the follower 182 does not engage the face cam 106, as in the "off" position of the ratchet cam assembly 98, the contact 178 engages the contact 180.

Contact 180 is connected to a wire 184 which connects with the other side of the shunt field winding 142. The other side of the shunt field winding 142 is also connected to ground through a resistor 186. The resistors 174 and 186 constitute speed controlling means for the motor 16. The resistor 174 may be on the order of twenty ohms and the resistor 186 may be on the order of sixty ohms.

The wire 154 is connected to a wire 188 which is connected to a leaf spring switch contact 190. Contact 190 is engageable with a leaf spring switch contact 192 that is connected by a wire 194 to the other side of the series field winding 140. Contact 192 can be moved by a relay plunger 196 into engagement with the contact 190 upon energization of the coil 156. Contact 190 carries a follower 198 engageable with a cam 200. The cam 200 only engages the follower 198 when the crank assembly 20 operates in its parking orbit, and the wiper blades 26 arrive at the depressed parked position.

The wire 154 is also connected to a wire 202 which is connected to coil 204 of the electromagnet 126. The other end of the coil 204 is connected to a wire 206 and to the stationary contact 168. Accordingly, when the movable contact 166 is moved into engagement with the stationary contact 168 electromagnet 126 will be energized from the battery through overload switch 152, wire 202, the coil 204, wire 206 and switch contacts 168 and 166.

Operation of the wiper unit alone is controlled by movement of the bridging contact 164. When the bridging contact 164 is moved from the "off" position to the low speed position wherein it connects contacts 170 and 160, the relay coil 156 will be energized from the battery through overload switch 152, wire 154, coil 156, wire 158 and contacts 160 and 164. Accordingly, switch contact 192 will move into engagement with switch contact 190 to energize the motor from the battery through overload switch 152, wires 154 and 188, contacts 190 and 192, wire 194 and series field winding 140. In the low speed position the shunt field winding 142 is fully energized from the series field winding through wire 184, switch contacts 180 and 178, wire 176 and switch contacts 170 and 164.

When the bridging contact 164 is moved to the medium speed position wherein the bridging contacts 172 and 160, resistor 174 is connected in series with shunt field winding 142, thereby reducing the energization of the shunt field winding and causing the motor to run at higher speed. When the bridging contact 164 is moved to the high speed position, the shunt field winding 142 is energized through the resistor 186 thereby further reducing the energization of the shunt field winding. When the bridging contact 164 is moved to the "off" position, relay coil 156 is deenergized. However, since contacts 190 and 192 remain in engagement, the motor 16 continues to be energized until the crank assembly moves into its parking orbit and the blades 26 arrive at the depressed parked position. When the blades arrive at the depressed parked position the cam 200 will engage the follower 198 to move contact 190 out of engagement with contact 192 thereby deenergizing the motor.

To initiate a cycle of conjoint operation of the wiper unit and the washer, the contact 166 is moved into engagement with contact 168 and the contact 164 is moved into bridging engagement with contacts 160 and 170. With contact 164 bridging contacts 160 and 170, the motor 16 will be energized for low speed operation. When contact 166 engages contact 168, the electromagnet 126 is energized so that the armature 132 is moved into engagement with the electromagnet core thereby permitting the pawl 110 to engage the ratchet teeth 100 and impart step by step movement to the ratchet cam assembly 98. After the ratchet cam assembly has been moved through a distance of one tooth in the counterclockwise direction, as viewed in Figures 2 and 3, the lug 94 will be disengaged from the lockout cam 96 permitting the spring 78 to compress the bulb 44 and effect a delivery stroke thereof. At the same time, the face cam 106 will engage the follower 182 to separate contacts 178 and 180 thereby connecting the resistor 186 in series with the shunt field winding 142 so as to operate the motor 16 at high speed. Since the crank arm 124 makes one complete revolution during each revolution of the worm gear of the gear reduction unit 18, and since the wiper blades 26 are moved through an inboard stroke and an outboard stroke during a complete rotation of the worm gear, it can be seen that the washer pump will complete two intake strokes and two delivery strokes during each revolution of the crank 124 and the cam 118. Moreover, since the drive pawl 110 is driven by the lever 88, the ratchet cam assembly 98 will be moved through a distance of two teeth in the counterclockwise direction for each complete revolution of the cam 118. After the ratchet cam 98 has been moved throughout a distance of 180°, the lug 94 will reengage the lockout cam 96 thereby interrupting the driving connection between the rod 70 and the pin 86 to automatically arrest the washer unit. At the same time, the follower 182 will be disengaged from the face cam 106 whereupon the resistor 186 will be shunted by wire 184, contacts 180 and 178, wire 176 and contacts 170 and 164. Therefore, the motor will return to the low speed operation, and the ratchet cam assembly 98 will be moved back to the "off" position by completing one revolution. When the ratchet cam 98 has completed one revolution, the follower 138 drops into the notch 104 thereby interrupting the driving connection between the pawl 110 and the ratchet cam 98. The wiper unit will continue to operate until the driver manually moves the movable contact 164 from the low speed position to the "off" position.

Thus, it can be seen that the present invention provides a system wherein the wiper unit can be operated alone or conjointly with the washer unit. During conjoint operation of the washer unit and the wiper unit, the wiper unit operates at high speed for a predetermined number of strokes during which the washer unit is operative to intermittently discharge liquid solvent onto the windshield. When the washer unit is automatically arrested, the wiper unit is returned to the low speed operation for drying the windshield, and when all of the liquid solvent has been removed, the driver can turn the wiper unit off. In addition, if the washer unit should be energized under adverse weather conditions when the outside temperature is below the freezing point of the liquid solvent, the entire system can be deenergized by moving the switch 164 to the "off" position. After the windshield has been heated by the windshield defrosting system of the vehicle, the contact 164 can be moved to the "on" position, at which time the conjoint operation of the wiper unit and the washer unit will be continued, and after the windshield has been dried, the driver can manually turn off the wiper unit.

With particular reference to Figures 5 through 9, a physical embodiment of the coordinated control switch assembly will be described. The coordinated control switch assembly includes a cup-shaped metallic housing 210 which is suitably secured to the instrument panel of the vehicle so as to be electrically connected to ground. The housing 210 is formed with three circumferentially spaced locating notches 212, 214 and 216, the notch 216 being larger than the notches 212 and 214, and the open end thereof is closed by a switch base 218 of suitable insulating material. The plate 218 is formed with three circumferentially spaced lugs 220, 222 and 224, the lug 224 being enlarged so as to be received only by the notch 216.

As seen particularly in Figure 5, the bottom wall of the cup-shaped housing 210 is formed with two sets of circumferentially spaced detent depressions 226 and 228. In addition, the bottom of the cup-shaped housing is formed with a counterbore 230 having radially extending spaced projections 232 and 234. A hollow, rotatable contact carrier shaft 236 is rotatably journalled within the housing 210. The shaft 236 has a forked, or bifurcated, end 238 and a stop lug 240 which coacts with the projections 232 and 234 to limit rotation of the shaft 236 in both directions. As seen in Figures 5 and 7, a detent blade is disposed in the bottom of the bifurcated portion 238, the detent blade 242 having a diametrically opposed conical projection 244 and 246 engageable with the recesses 226 and 228 respectively. The detent blade 242 is also formed with a rectangular central opening 248. A coil spring 250 is interposed between the detent blade 242 and a contact blade 164. The contact blade 164 is formed with a central rectangular opening 254 and carries contacts 256 and 258.

The spring 250 maintains the detent blade 242 in resilient engagement with the housing 210, and likewise maintains the contact blade 164 in resilient engagement with the switch base 218, both blades being received in the forked end of the shaft so as to be connected for rotation therewith. The contact base 218 has three circumferentially spaced arcuate stationary contacts 160, 170 and 172 thereon as well as a U-shaped stationary contact 168. As seen in Figure 7, the stationary U-shaped contact 168 is formed with a central aperture 252.

A rotatable and reciprocable rod constituting the movable contact 166 is coaxially disposed within the hollow shaft 236. The contact rod 166 is formed with a twisted, or helical, cam surface 260 adjacent its end. In addition, the upper end of the contact rod 166 is connected to a push button 262 which is normally biased outwardly by a spring 264. One end of the spring 264 engages the button 262 and the other end engages a knob 266 attached to the shaft 236.

The switch base 218, as seen in Figures 8 and 9, has a central aperture 268 formed with diametrically opposed inwardly extending teeth, or cam follower portions, 270 and 272. When the push button 262, and hence the rod 166, are moved axially inwardly, to the position shown in Figure 7, where the rod 166 engages contact 168, the helical cam surface 260 engages the followers 270 and 272 thereby turning the rod 166 in the counterclockwise direction as viewed in Figure 5. Rotation of the rod contact 166 rotates the contact blade 164, the detent blade 242 and the shaft 236, since the flat portion of the contact rod 166 extends through the rectangular slots 248 and 254 of the detent blade 242 and the contact blade 164, respectively. The twist of the cam surface 260 is sufficient to rotate the contact blade 164, the detent blade 242 and the shaft 236 one notch in the counterclockwise direction as viewed in Figure 5, namely from the "off" position to the low speed position. Upon release of the button 262, the spring 264 restores the rod 166 and the button 262 to its normal position, but since the connection between the cam 260 and the followers 270 and 272 operates in only one direction, the shaft 236, the detent blade 242 and the contact blade 164 remain in the low speed position. In order to return the contact blade 164 to the "off" position, the knob 266 and the shaft 236 must be moved in the clockwise direction as viewed in Figure 5.

From the foregoing it is apparent that the present invention provides a unique coordinating control switch assembly for a washer unit and a wiper unit whereby the single act of depressing a button turns the wiper unit control switch to the low speed position and energizes an electromagnet for establishing the driving connection between the washer unit and the wiper unit. The wiper unit will continue to operate until the control switch is manually moved to the "off" position by the operator.

While the embodiment of the invention as herein disclosed constitutes a preferred form, it is to be understood that other forms might be adopted.

What is claimed is as follows:

1. A joint control for a wiper unit and a washer unit, including, a housing, a control shaft rotatably journalled in said housing, a rod coaxial with said shaft and constrained for rotation therewith but adapted for axial movement relative to said shaft, means operatively connected with said shaft and actuated by rotation thereof for activating and inactivating said wiper unit, means actuated upon axial movement of said rod for controlling the activation of said washer unit, and means coacting with said rod for effecting rotation of said rod simultaneously with axial movement thereof for rotating said control shaft to activate said wiper unit simultaneously with activation of said washer unit.

2. A joint control for a wiper unit and a washer unit, including, a housing, a control shaft rotatably journalled in said housing, a rod coaxial with said control shaft and constrained for rotation therewith but adapted for axial movement relative to said shaft, means actuated upon axial movement of said rod in one direction for controlling the activation of the washer unit, and means coacting with said rod for effecting rotation of said rod simultaneously with axial movement thereof for rotating said control shaft to activate the wiper unit simultaneously with activation of the washer unit.

3. A joint control for a wiper unit and a washer unit, including, a housing, a control shaft rotatably journalled in the housing, a rod coaxial with said shaft and constrained for rotation therewith but adapted for axial movement relative to said shaft, means operatively connected with said shaft and actuated by rotation thereof for activating and inactivating the wiper unit, means actuated upon axial movement of said rod in one direction for controlling the activation of the washer unit, and means coacting with said rod for effecting rotation of said rod simultaneously with axial movement thereof in one direction for rotating said control shaft to activate said wiper unit simultaneously with activation of said washer unit.

4. A joint control for a wiper unit and a washer unit, including, a rotatable control member for activating and inactivating the wiper unit, a reciprocable control member for activating the washer unit, means connecting said two members for preventing relative rotation therebetween, and means coacting with said second member for effecting rotation thereof upon reciprocation of said second member in one direction so as to rotate said first member and activate said wiper unit simultaneously with said washer unit.

5. A joint control for a wiper unit and a washer unit, including, a first manual control member for activating and inactivating said wiper unit, a second manual control member for activating said washer unit, and means interconnecting said two control members whereby a predetermined movement of said second member to activate the washer unit automatically imparts movement to said first member to simultaneously activate said wiper unit, said wiper unit remaining activated until said first manual control member is manually moved to the "off" position.

6. A joint control for a wiper unit and a washer unit, including, a first manual control member for controlling the activation of the wiper unit, a second control member for controlling the activation of the washer unit, means for effecting a first predetermined movement of both of said members to activate only said wiper unit, and means operative upon a second predetermined movement of said second member for automatically imparting said first predetermined movement to said first member to simultaneously activate said wiper unit and said washer unit.

7. A joint control for a wiper unit and a washer unit, including, a housing, a first control member rotatably journalled in said housing, a second control member constrained for rotation with said first control member but movable axially relative thereto, means operatively connected with said first control member and actuated by rotation thereof for activating and inactivating the wiper unit, means actuated upon axial movement of the second control member in one direction for activating said washer unit, and means coacting with said second control member for effecting rotation thereof simultaneously with axial movement of said second control member for rotating said first control member to activate said wiper unit simultaneously with activation of said washer unit.

8. The joint control set forth in claim 7 including resilient means engaging said second control member for effecting axial movement thereof in the opposite direction.

9. The joint control set forth in claim 7 including a base having an aperture with a pair of cam followers projecting thereinto, and wherein said last recited means includes helical cam means on the second control member which coact with said cam followers to rotate said second control member upon axial movement thereof in said one direction.

10. A joint control for a wiper unit and a washer unit, including, a housing, a control shaft rotatably journalled in said housing having a forked end, a control member disposed within the forked end of said shaft so as to be rotatable therewith, a rod coaxial with said shaft but adapted for axial movement relative thereto, said control member having a rectangular slot through which said rod extends whereby said rod is connected for rotation with said control member and said shaft, said rod having helical cam means formed on the end thereof, and a base attached to said housing and having a central aperture with a pair of cam followers projecting thereinto, said cam followers coacting with said helical cam means on the rod for rotating said rod upon axial movement thereof in one direction.

References Cited in the file of this patent

UNITED STATES PATENTS

| | | |
|---|---|---|
| 2,206,814 | Horton | July 2, 1940 |
| 2,702,918 | Neufeld | Mar. 1, 1955 |